US005555073A

United States Patent [19]

Grossman et al.

[11] Patent Number: 5,555,073

[45] Date of Patent: Sep. 10, 1996

[54] CORRECTING METHOD AND DEVICE FOR A PHOTOGRAPHIC COPYING APPARATUS

[75] Inventors: Walter Grossman, Russikon, Switzerland; Kuraji Nitta; Koji Kita, both of Wakayama-ken, Japan

[73] Assignee: Noritsu Koki Co., Ltd., Japan

[21] Appl. No.: 341,696

[22] Filed: Nov. 18, 1994

Related U.S. Application Data

[63] Continuation of Ser. No. 81,676, Jun. 23, 1993, abandoned.

[51] Int. Cl.[6] .......... G03B 27/80

[52] U.S. Cl. .......... 355/41; 355/35; 355/38; 355/68; 355/71

[56] References Cited

U.S. PATENT DOCUMENTS

| | | | |
|---|---|---|---|
| 5,017,014 | 5/1991 | Terashita | 355/35 |
| 5,083,154 | 1/1992 | Terashita et al. | 355/68 |
| 5,119,125 | 6/1992 | Kraft | 355/38 |
| 5,162,841 | 11/1992 | Terashita | 355/38 |
| 5,164,574 | 11/1992 | Ujiie et al. | 355/41 |

*Primary Examiner*—Michael L. Gellner
*Assistant Examiner*—Daniel P. Malley
*Attorney, Agent, or Firm*—Webb Ziesenheim Bruening Logsdon Orkin & Hanson, P.C.

[57] ABSTRACT

A photographic copying apparatus has a DX code reader for reading a DX code or identification code on negative film, a film scanner for acquiring density information of the negative film, and an exposure station for exposing printing paper. The exposure station is controlled based on exposure information derived from conversion information selected with reference to the identification and density information. A reference film is test-coped for correction purposes, and conversion information for plural types of film is corrected based on density of the test copy and density of the reference film measured by the film scanner.

12 Claims, 3 Drawing Sheets

4
2
46
3
6
45
23
42
1
(8)
21
44
22
43
21
21
41
exp. control
5
keyboard
densito-meter
51
52

CORRECTING METHOD AND DEVICE FOR A PHOTOGRAPHIC COPYING APPARATUS

This is a continuation of application Ser. No. 08/081,676 filed on Jun. 23, 1993, now abandoned.

BACKGROUND OF THE INVENTION

1. Field of the Invention

This invention relates to a correcting method and device for a photographic copying apparatus.

2. Description of the Related Art

With a photographic copying apparatus, it is necessary to correct conversion information to cope with temporal changes i.e., changes occurring over time, of a film density measuring device and a printing paper exposure device.

Conventionally, plural types of correcting film are prepared for all combinations of film to be copied and printing paper likely to be used on the apparatus. These types of correcting film are used to correct plural types of conversion information.

In the prior art, however, the larger the number of types of film used for copying, the more time and labor are required to carry out the correcting operation. A simplified correcting operation has been desired for the photographic copying apparatus.

SUMMARY OF THE INVENTION

The present invention has been made having regard to the above state of the art, and its object is to provide a correcting method and device for expediting and saving labor in a correcting operation for the photographic copying apparatus even if numerous or plural types of film are to be loaded for copying.

The above object is fulfilled, according to one aspect of the present invention, by a correcting method for use with a photographic copying apparatus, comprising the steps of detecting identification information with film identifying means, the identification information showing a type among a plurality of types of film loaded for copying; measuring density information of the film loaded for copying with film density measuring means; and controlling printing paper exposure means with control means based on the identification information and the density information; wherein the control means is operable to select, based on the identification information, conversion information corresponding to the film loaded for copying from plural types of conversion information prepared for deriving exposure information from the density information to control the printing paper exposure means, and prepared in accordance with a plurality of combinations of film for copying and printing paper, to derive the exposure information from the convertion information selected as corresponding to the film loaded for copying and the density information, and to control the printing paper exposure means based on the exposure information derived.

This method is characterized in that the control means is operable to control the printing paper exposure means to test-copy one correcting film loaded, and to correct the conversion information of the plural types of film for copying based on density information of a test copy and density information of the correcting film measured by the film density measuring means.

In correcting the photographic copying apparatus by the method according to the present invention, the film density measuring means measures density information of one correcting film, and the control means, based on exposure information, controls the printing paper exposure means to carry out the test copying. Based on density information of the test copy measured and density information received from the film density measuring means, a correction is made of plural types of conversion information prepared for plural combinations of the film to be copied and printing paper. That is, the invention has been made taking note of the fact that temporal changes, i.e., changes occurring over time, of the film density measuring means and printing paper exposure means affect all types of film in the same way. Thus, a correcting operation is carried out by means of one correcting film to correct plural types of conversion information relating to plural combinations of the film for copying and printing paper likely to be used on the photographic copying apparatus.

With this correcting method for the photographic copying apparatus, a correcting operation is effected in one stroke by means of one correcting film to correct plural types of conversion information relating to plural combinations of the film for copying and printing paper likely to be used with the photographic copying apparatus. The correcting operation is expedited and labor is saved in the correcting operation for the photographic copying apparatus even if numerous types of film are used for copying.

The control means may be operable to determine exposure information for the test copying from density information measured by the film density measuring means and reference conversion information prepared for the correcting film to obtain the exposure information from the density information.

The control means may execute the test copying based on exposure information prepared for the correcting film.

Further, the control means may correct reference conversion information of the correcting film based on the density information of the test copy and the density information measured by the film density measuring means, and thereafter to correct the plural types of conversion information of film for copying based on relational information showing relations between the reference conversion information of the correcting film and the conversion information of the plural types of film for copying.

The correcting film may be formed of film identical in type to one of the plural types of film to be copies. This provides an advantage over the case of preparing the correcting film from a special type of film, in that it is unnecessary to prepare conversion information specially for correction purposes.

In a further aspect of the invention, a correcting device for a photographic copying apparatus is provided, which comprises film identifying means for detecting identification information showing a type among a plurality of types of film loaded for copying; film density measuring means for measuring density information of the film loaded for copying; and control means for controlling printing paper exposure means based on the identification information and the density information; wherein the control means is operable to select, based on the identification information, conversion information corresponding to the film loaded for copying from plural types of conversion information prepared for deriving exposure information from the density information to control the printing paper exposure means, and prepared in accordance with a plurality of combinations of film for copying and printing paper, to derive the exposure information from the conversion information selected as corresponding to the film loaded for copying and the density information, and to control the printing paper exposure means based on the exposure information derived.

This apparatus is characterized in that copy density measuring means is provided for measuring density of a copy exposed by the printing paper exposure means, and that the control means is operable to control the printing paper exposure means to test-copy one correcting film loaded, and to correct the conversion information of the plural types of film for copying based on density information of a test copy measured by the copy density measuring means and density information of the correcting film measured by the film density measuring means.

With this correcting device, the control means automatically performs the functions included in the foregoing correcting method. Further labor saving is achieved for the correcting operation since the control means automatically carries out the various processes for the correction.

The foregoing and other objects, features and advantages of the invention will be apparent from the following more particular description of a preferred embodiment of the invention, as illustrated in the accompanying drawings.

DETAILED DESCRIPTION OF THE PREFERRED EMBODIMENT

A color photographic copying apparatus according to the present invention will be described with reference to the drawings.

Figure 1:
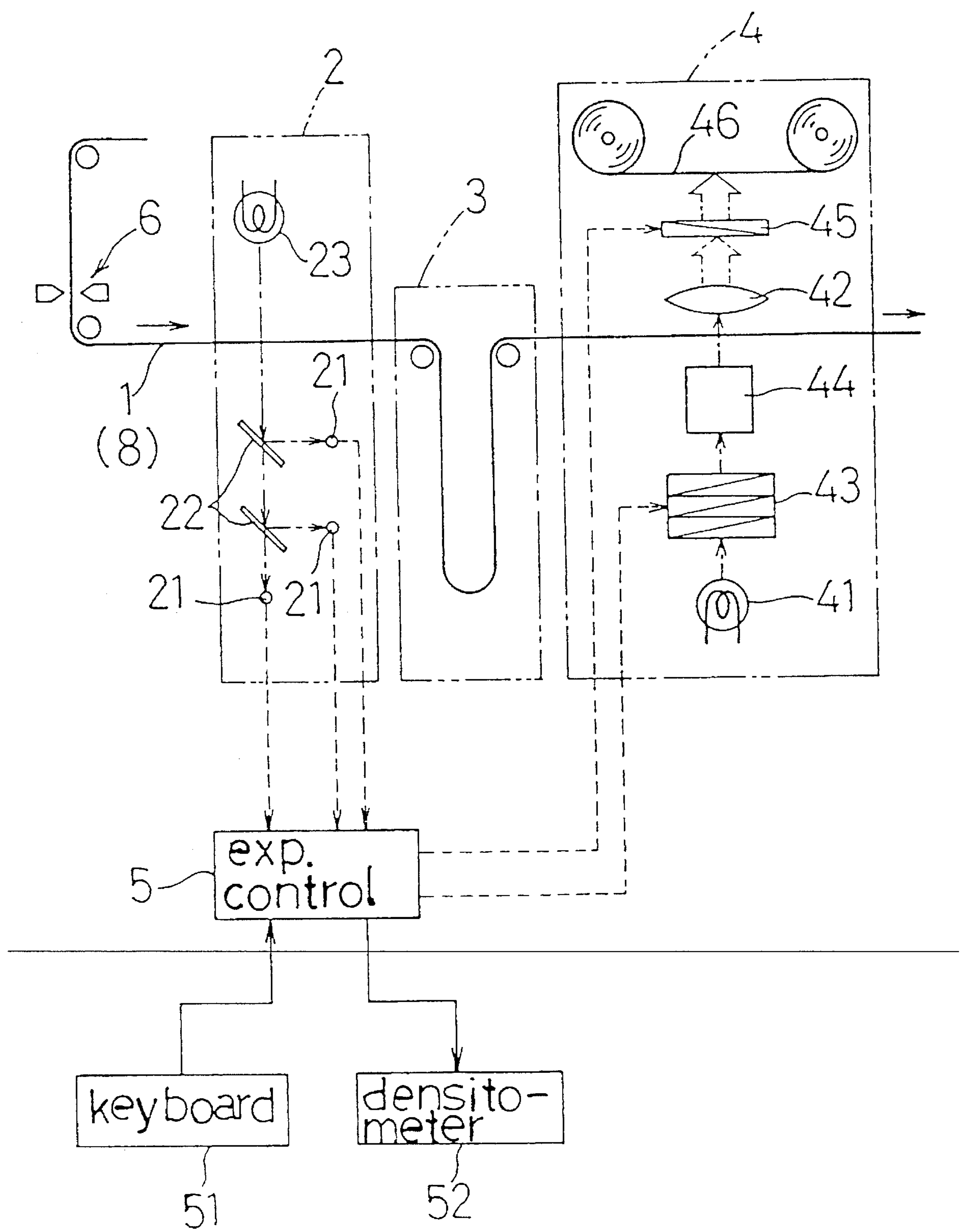
FIG. 1 is a view showing an outline of a photographic copying apparatus according to the present invention.

FIG. 1 shows an outline of the color photographic copying apparatus. A length of developed negative film 1 to be copied moves from left to right in FIG. 1. The negative film 1 passes successively through a DX code reader 6 acting as a film identifying device, a negative film scanner 2 acting as a film density measuring device, a storage section 3, and a printing paper exposure station 4 acting as a printing paper exposing device.

An exposure controller 5 acting as a control device, or control means based on identification information also referred to as selected conversion information of the negative film 1 detected by the DX code reader 6, selects conversion information, which will be described later, to be used for the negative film 1 and printing paper 46. The exposure controller 5 controls the printing paper exposure station 4 based on the conversion information, and density information measured by the film scanner 2.

This color photographic copying apparatus has a normal print mode for printing negative film 1, and a correction mode for adjusting the apparatus as described later. One of these operating modes is selected through a keyboard 51 for inputting commands and data.

The DX code reader 6 reads a DX code which is an identification code recorded on film. As noted above, the DX code reader 6 transmits the identification information to the exposure controller 5. The negative film scanner 2 includes a combination of line sensors 21 and color filters 22 to divide each frame of the negative film 1 into a plurality of regions and to separate light emitted from a reading light source 23 and having passed through the negative film 1 into three primaries, red, green and blue, to be measured for each region. The number of regions into which one frame is divided is 100 to 1,000, depending on the number of segments of the line sensors 21, segment width in the feeding direction of negative film 1, and feeding rate of the negative film 1. Measurements obtained by the film scanner 2 are transmitted as density information to the exposure controller 5. The exposure controller 5 converts the measurements transmitted as density information from the film scanner 2 into density values by obtaining logarithms of the measurements. These density values are thereafter regarded as the density values of negative film 1.

The storage section 3 is where the negative film 1 stands by instead of being fed to the printing paper exposure station 4 until the film scanner 2 completes density measurement of all or some of the frames on the negative film 1. The negative film 1 is stored therein in loop form. This storage section 3 may be omitted if a sufficient track length is provided for the negative film 1 between the film scanner 2 and exposure station 4.

The exposure station 4 includes an exposure light source 41 for illuminating frames of the negative film 1 to be printed, and a lens 42 for projecting images recorded on the negative film 1 to the printing paper 46. The color balance of exposure light, namely exposure values of the respective colors, is adjusted by the exposure controller 5 processing the density information of the negative film 1 measured by the film scanner 2, and suitably controlling an optical filter 43. The exposure station 4 further includes a light diffuser 44 for effecting a uniform color mixture of light having passed through the optical filter 43, and a shutter 45 for shutting the optical path upon completion of exposure.

Based on the identification information received from the DX code reader 6 and density information received from the negative film scanner 2, the exposure controller 5 controls the printing paper exposure station 4 in the following sequence.

In controlling the optical filter 43 of the exposure station 4 based on the density information from the film scanner 2, it is necessary to extract information to be printed from the negative film 1. This information extracting sequence will be described first.

Figure 2:
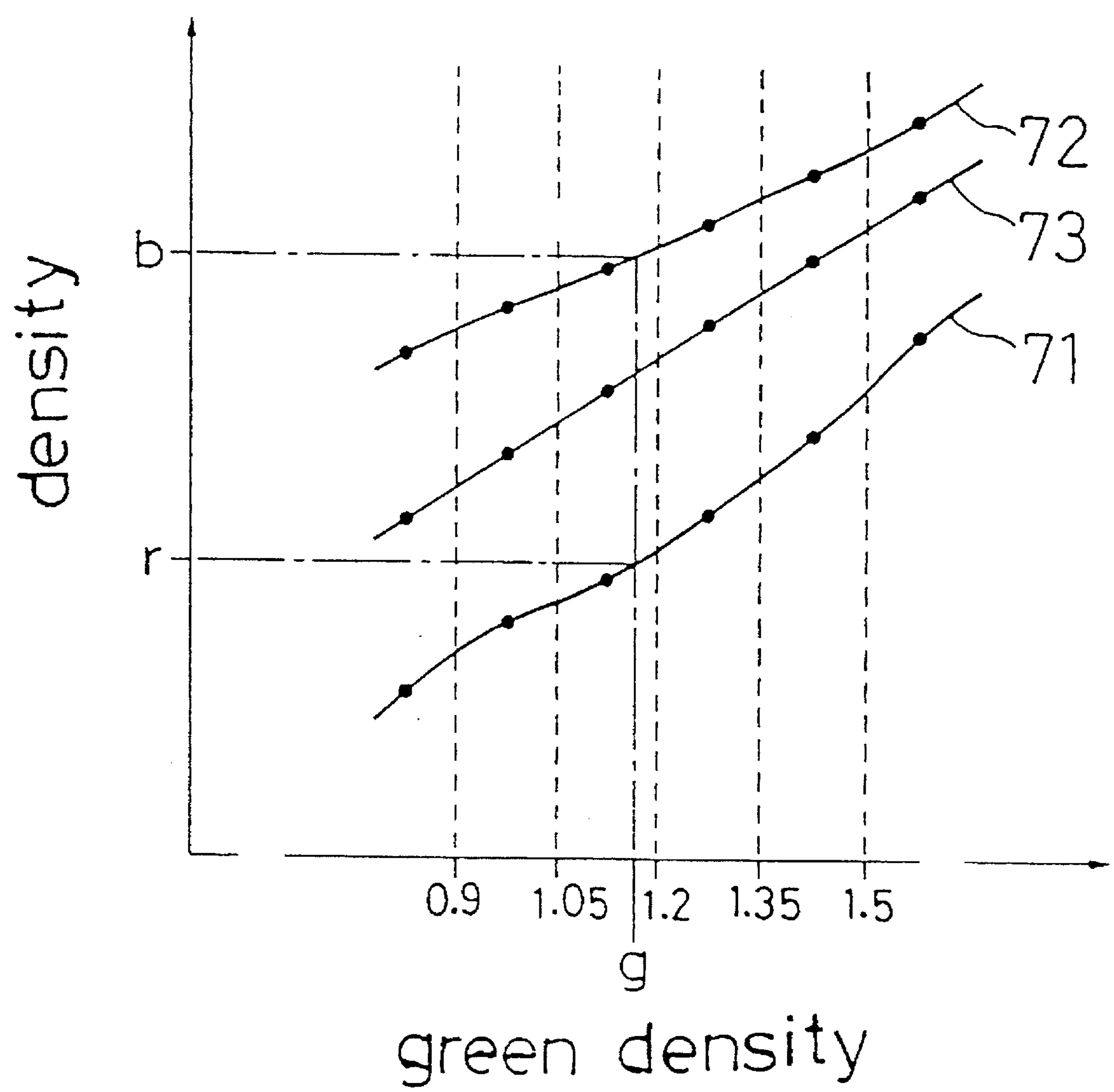
FIG. 2 is an explanatory view of data processing.

After converting the photometric values received from the film scanner 2 into density values, the green density among the three primary density data is treated as a reference for classifying the data of each measured region by a green density value. Specifically, the green density is divided at appropriate intervals, and the data of each measured region are grouped for each division. Then, averages of green density data, red density data and blue density data belonging to each group are obtained. These averages are plotted in FIG. 2. In FIG. 2, the green density is divided into groups at intervals of 0.15. The horizontal axis represents green density, while the vertical axis represents red density and blue density. The plotted dots are approximated to curves of an appropriate degree to obtain a red characteristic curve 71 and a blue characteristic curve 72. FIG. 2 also shows a green characteristic line 73 plotted for comparison purposes.

The dots on the two characteristic curves 71 and 72 corresponding to the same green density may be regarded by what is known as Evans's principle as being obtained by photographing a gray object. These are the information peculiar to the negative film 1 not influenced by the photographed object. Thus, regarding the two characteristic curves 71 and 72 in FIG. 2, red density "r" and blue density "b" corresponding to average green density "g" in a frame to be printed are the densities allowing this frame to be regarded as equivalent to gray.

The density values thus obtained cannot be used as they are in calculating exposures since spectral sensitivity in the film scanner 2 usually does not agree with overall spectral sensitivity including spectral sensitivity of the printing paper in the exposure station 4. It is therefore necessary to effect a correction to make the spectral sensitivity in the film scanner 2 agree with the spectral sensitivity in the exposure station 4.

A basic concept of correcting the disagreement in spectral sensitivity will be described with reference to FIG. 3.

Figure 3:
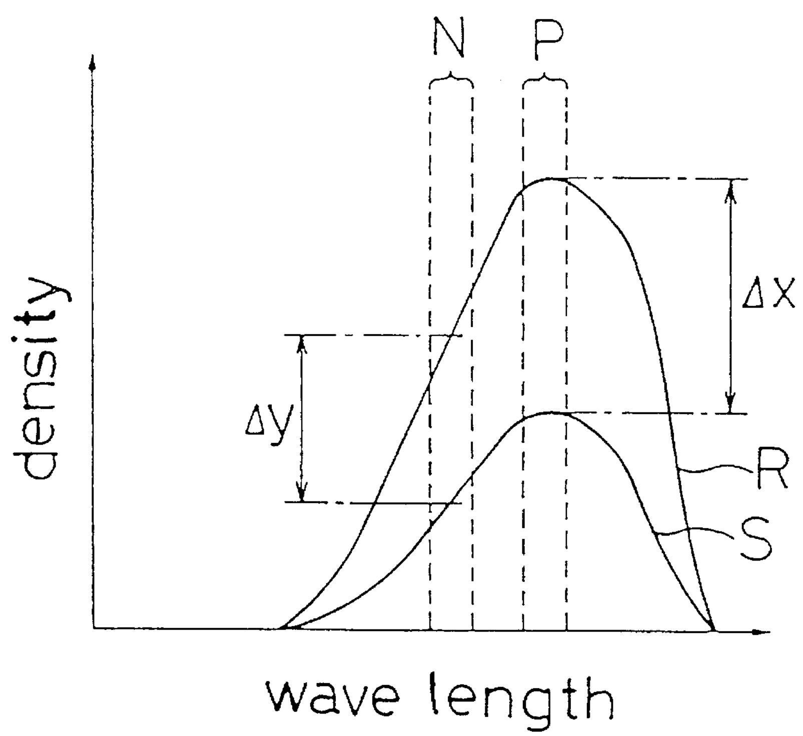
FIG. 3 is an explanatory view of a spectral sensitivity correction.

In FIG. 3, the two curves R and S show wavelength-dependent or transmission spectra of color information of the negative film 1 in different exposures. Wavelength range P shows a peak position of the spectral sensitivity of the printing paper. Wavelength range N shows a peak position of the spectral sensitivity of the negative film scanner 2. As seen from FIG. 3, $\Delta y$ is the difference in density between exposure R and exposure S within the wavelength range N and $\Delta x$ is the difference in density between exposure R and exposure S within the wavelength range P; the differences in sensitivity between the printing paper and film scanner 2, $\Delta x$ and $\Delta y$, with respect to the different exposures of the negative film 1 may be corrected with coefficient $\Delta x/\Delta y$.

The three colors are manipulated in actual correction, and cross talks occurring among them complicate the process.

A sequence of actual correction will be described hereinafter.

The correction is carried out based on a conversion expression providing conversion information for converting variations in the density values obtained from the photometric values transmitted from the film scanner 2, into variations in the density values on the printing paper. This conversion expression may be in a matrix representation (1).

$$\begin{pmatrix} \Delta R \\ \Delta G \\ \Delta B \end{pmatrix} = \begin{pmatrix} a_{11} & a_{12} & a_{13} \\ a_{21} & a_{22} & a_{23} \\ a_{31} & a_{32} & a_{33} \end{pmatrix} \begin{pmatrix} \Delta r \\ \Delta g \\ \Delta b \end{pmatrix} \quad (1)$$

Figure 4:
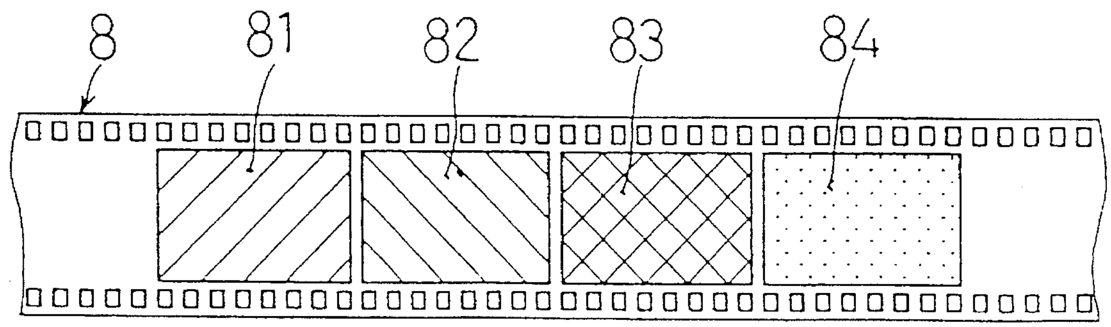
FIG. 4 is a schematic view of correcting film.

In the expression (1), $\Delta r$, $\Delta g$ and $\Delta b$ are variations in the density values for the three primaries obtained from the photometric values from the film scanner 2, $\Delta R$, $\Delta G$ and $\Delta B$ are variations in the density values on the printing paper, and a11 to a33 are constants. The constants a11 to a33 may be obtained by preparing a correcting negative film 8 including four frames as shown in FIG. 4, i.e. a gray frame 81, a frame 82 with red density increased by a predetermined amount, a frame 83 with green density increased by the predetermined amount, and a frame 84 with blue density increased by the predetermined amount, test-printing the frames under the same exposure condition, and measuring the densities. That is, $\Delta r$, $\Delta g$ and $\Delta b$ are derived from density differences between the gray frame and the frames with the respective colors increased by the predetermined amount. Then, $\Delta R$, $\Delta G$ and $\Delta B$ are derived from density differences between the test print of the gray frame and test prints of the frames with the respective colors increased by the predetermined amount. Finally, simultaneous equations breaking down the expression (1) are solved.

The constants a11 to a33 in the expression (1) are variable with different combinations of negative film 1 and printing paper 46 since the negative film 1 and printing paper 46 have different spectral sensitivities, respectively. Thus, a different converting expression must be prepared for each different combination of negative film 1 and printing paper 46, resulting in a plurality of different conversion expressions with a separate conversion expression associated with each combination of negative film 1 and printing paper 46.

Each combination of negative film 1 and printing paper 46 is associated with a unique converting expression (1). Each converting expression is stored in the exposure controller 5, or control means, after it is processed in the following way. Each converting expression is not stored in the exposure controller 5 in the form of expression (1) above. One converting expression associated with one specific reference combination of correcting film 8 and printing paper 46 is stored in the exposure controller 5 as a reference converting expression. The converting expressions for the other combination of negative film and printing paper are stored in the exposure controller as values relative to the reference converting expression as will be described in better detail hereinbelow.

Assuming, for example, that the converting expression (1) is the reference converting expression and that the expression (2) is a converting expression corresponding to a certain combination of negative film and printing paper, a specific example of such relational expression may be a matrix as in the expression (3) showing ratios between the respective constant matrix elements in the expressions (1) and (2).

$$\begin{pmatrix} \Delta R \\ \Delta G \\ \Delta B \end{pmatrix} = \begin{pmatrix} b_{11} & b_{12} & b_{13} \\ b_{21} & b_{22} & b_{23} \\ b_{31} & b_{32} & b_{33} \end{pmatrix} \begin{pmatrix} \Delta r \\ \Delta g \\ \Delta b \end{pmatrix} \quad (2)$$

$$\begin{pmatrix} b_{11}/a_{11} & b_{12}/a_{12} & b_{13}/a_{13} \\ b_{21}/a_{21} & b_{22}/a_{22} & b_{23}/a_{23} \\ b_{31}/a_{31} & b_{32}/a_{32} & b_{33}/a_{33} \end{pmatrix} \quad (3)$$

In actual use of the converting expressions, the DX code reader 6 determines the type of film, whereas the type of printing paper 46 is inputted through the command and data inputting keyboard 51. The converting expression (2) to be used is derived from the matrix expression (3) corresponding to this combination of negative film 1 and printing paper 46, and the reference converting expression (1). While this converting expression is expressed in variations, the constant terms forming the basis for the variations may be obtained by printing the correcting film 8 on the printing paper 46 and measuring the densities of the two.

The reference converting expression may be based not on the combination of a specially provided correcting film 8 and printing paper 46, but on one combination selected from combinations of negative film 1 and printing paper 46 likely to be used on this apparatus.

After correcting, by means of the above converting expression, the density values which allow frames for printing to be regarded as equivalent to gray, exposures are derived from the corrected density values. The corrected density values express density of negative film 1 in the color density appearing on the printing paper. Since the frame of the negative film 1 to be printed has a density regarded as equivalent to gray, exposures for a printing operation are determined so that the density of the printing paper 46 on which this frame is printed be also gray.

A sequence of determining exposures will be described hereinafter.

Exposures are determined by using a relationship between variations in exposure for print preparation and variations in density on the printing paper 46.

This relationship may be expressed by the following matrix expression (4):

$$\begin{pmatrix} \Delta Er \\ \Delta Eg \\ \Delta Eb \end{pmatrix} = \begin{pmatrix} c_{11} & c_{12} & c_{13} \\ c_{21} & c_{22} & c_{23} \\ c_{31} & c_{32} & c_{33} \end{pmatrix} \begin{pmatrix} \Delta Dr \\ \Delta Dg \\ \Delta Db \end{pmatrix} \quad (4)$$

In the expression (4), ΔDr, ΔDg and ΔDb am density variations on the printing paper 46, ΔEr, ΔEg and ΔEb are variations in exposure causing the density variations on the printing paper 46, and c11 to c33 are constants. The constants c11 to c33 may be obtained by preparing test prints with four exposures, i.e. an exposure for a gray print, an exposure for increasing red by a predetermined amount, an exposure for increasing green by the predetermined amount, and an exposure for increasing blue by the predetermined amount, and measuring the densities thereof. That is, ΔEr, ΔEg and ΔEb are derived from differences between the exposure for the gray print and the exposures for increasing the respective colors by the predetermined amount. Then, ΔDr, ΔDg and ΔDb are derived from density differences between the gray test print and test prints of the exposures for increasing the respective colors by the predetermined amount. Finally, simultaneous equations breaking down the expression (4) are solved.

The constants c11 to c33 in the expression (4) are variable with different combinations of negative film 1 and printing paper 46. Thus, a different converting expression must be prepared for each different combination of negative film 1 and printing paper 46, as in the case of converting expression (1).

Similarly, the different converting expression for each different combination of negative film 1 and printing paper 46 is not stored as it is in the exposure controller 5, but is stored after being subjected to certain processing. A converting expression prepared for the combination of correcting film 8 and printing paper 46 is stored intact as a reference converting expression in the exposure controller 5. Converting expressions corresponding to other combinations of negative film 1 and printing paper 46, and a relational expression providing information relational to the above reference converting expression are stored in the exposure controller 5.

Assuming, for example, that the converting expression (4) is the reference converting expression and that the expression (5) is a converting expression corresponding to a certain combination of negative film and printing paper, a specific example of such relational expression may be a matrix as in the expression (6) showing ratios between the respective constant matrix elements in the expressions (4) and (5).

$$\begin{pmatrix} \Delta Er \\ \Delta Eg \\ \Delta Eb \end{pmatrix} = \begin{pmatrix} d_{11} & d_{12} & d_{13} \\ d_{21} & d_{22} & d_{23} \\ d_{31} & d_{32} & d_{33} \end{pmatrix} \begin{pmatrix} \Delta Dr \\ \Delta Dg \\ \Delta Db \end{pmatrix} \quad (5)$$

$$\begin{pmatrix} d_{11}/c_{11} & d_{12}/c_{12} & d_{13}/c_{13} \\ d_{21}/c_{21} & d_{22}/c_{22} & d_{23}/c_{23} \\ d_{31}/c_{31} & d_{32}/c_{32} & d_{33}/c_{33} \end{pmatrix} \quad (6)$$

In actual use of the converting expressions, the DX code reader 6 determines the type of film, whereas the type of printing paper 46 is inputted through the command and data inputting keyboard 51. The converting expression (5) is derived from the matrix expression (6) corresponding to this combination of negative film 1 and printing paper 46, and the reference converting expression (4). The differences between the gray density value and the density values converted by the converting expression (1) or (2) are substituted for ΔDr, ΔDg and ΔDb to obtain exposure variations ΔEr, ΔEg and ΔEb. While this converting expression is expressed in exposure variations, the constant terms forming the basis for the variations may be obtained by using the exposure with which the gray print is prepared.

The reference converting expression may be based not on the combination of the specially provided correcting film 8 and printing paper 46, but on one combination selected from combinations of negative film 1 and printing paper 46 likely to be used with this apparatus. It is convenient in practice to use the same combination as for the reference convening expression corresponding to the expression (1).

In summary, expression (2) represents a unique conversion for converting variations in the density values obtained from the photometric values transmitted from the film scanner 2 into variations in the density values on the printing paper for one specific combination of negative film 1 and printing paper 46. The constants b11 to b33 will change with different combinations of negative film 1 and printing paper 46. In contrast, expression (5) represents a relationship or converting expression between variations in exposure for print preparation and variations in density on the printing paper 46, again for one specific combination of negative film 1 and printing paper 46. The constants d11 to d33 change with a different combination of negative film 1 and printing paper 46 as do constants b11 to b33 in expression (2). It should be understood that both converting expressions (2) and (5) are required to process any print for a specific combination of negative film 1 and printing paper 46.

Expressions (2) and (5) are analogous to each other in that both are unique converting expressions for specific combinations of negative film and printing paper, and both are stored in the exposure controller 5 in an analogous way. Both converting expressions are processed relative to a reference converting expression (1) or (4), respectively, as shown in converting matrix expressions (3) and (6). In this manner, all of the converting expressions are interrelated with the associated reference converting expression and are easily updated.

The converting expressions (5) and (2) for a certain combination of negative film and printing paper combine to form conversion information necessary for making a print with that specific combination of negative film and printing paper. Consequently, there are a plurality of types of conversion information which relates to the different combination of negative film and printing paper.

The exposure controller 5, as noted hereinbefore, selects relational information in the expressions (3) and (6) based on the film identification information received from the DX code reader 6, and derives conversion information corresponding to the combination of the film to be copied and the printing paper from the relational information and the reference conversion information in the expressions (1) and (4). In other words, based on the film identification information from the DX code reader 6, the exposure controller 5, also referred to as the control means, selects conversion information corresponding to the combination of the film loaded to be copied and the printing paper from plural types of conversion information. Based on the conversion information and the measurement information or density information from the film scanner 2, the exposure controller 5 determines exposures which are the exposure information for preparing a print. Further, based on the exposure information, the exposure controller 5 controls the printing paper exposure station 4.

An apparatus correction will be described next.

After the apparatus is switched from the operating mode to the correction mode in response to a command from the keyboard 51, the exposure controller 5 causes the film scanner 2 to measure density of the correcting film 8. Then the correcting film 8 is test-copied to the printing paper 46 to obtain a new reference converting expression corresponding to the expression (1) or (4) in the same way as described above. A copy or print, also referred to as test-copy printing paper, produced by the test copying may be metered by a densitometer 52 connected to the exposure controller 5 to act as a copy density measuring device or copy density measuring means. The densitometer 52 may of course be used in print density measurement in general without being limited to the correction purposes. The exposure condition for the correcting film 8 in test copying is based on the density of gray frame 81 in the correcting film 8 measured by the film scanner 2. An exposure may be derived from the measured density as described hereinbefore, or an exposure predetermined as appropriate for the gray frame 81 may be used.

Expressions corresponding to the expressions (1) and (4) are provided for all combinations of negative film 1 and printing paper 46 likely to be used on the apparatus. In effecting corrections, it is unnecessary to obtain new converting expressions for all such combinations. A new reference converting expression may be obtained for correction purposes, as described above. Then, next converting expressions for all combinations of negative film 1 and printing paper 46 may be derived from the new reference converting expression and the relational expression of the already obtained reference converting expression and respective converting expressions.

As described above, the correction mode is also controlled by the exposure controller 5. This is because the respective components of the color photographic copying apparatus are used in the correction mode as well. It means that a correcting device is incorporated as an integral part of the color photographic copying apparatus.

In the foregoing embodiment, all the converting expressions are corrected with the corrected reference convening expression and relational expression. Instead, all the converting expressions may be corrected by adding an amount of correction in exposure derived from the correcting film 8 and printing paper to the respective converting expressions.

The four-frame negative is used as the correcting film 8 as shown in FIG. 3. The densities of the respective frames may be accommodated into divided regions of one frame. A frame or frames of other color(s) having an increased density may be added.

What is claimed is:

1. A correcting device for a photographic copying apparatus comprising:

a film identifying means for obtaining identification information identifying a type from among a plurality of types of film loaded for copying;

a film density measuring means for measuring density information of said film loaded for copying;

a printing paper exposure means for exposing printing paper;

a control means for controlling said printing paper exposure means based on said identification information and said density information; and a copy density measuring means for measuring density of a copy exposed;

wherein said control means stores plural types of conversion information corresponding to a plurality of combinations of said films for copying and said printing papers, said control means selects one of said plural types of conversion information based on said identification information and on a printing paper employed, said control means derives said exposure information from said selected conversion information and said density information, said control means controls said printing paper exposure means based on said exposure information derived from said density information and said selected conversion information, and said control means test-copies a loaded correcting film on a printing paper by controlling said printing paper exposure means, and correcting said plural types of conversion information based on density information of said test-copied printing paper and on density information of said correcting film measured by said film density measuring means, and wherein said control means corrects reference conversion information of said correcting film based on said density information of said test copy and said density information measured by said film density measuring means, and thereafter corrects said plural types of conversion information of film for copying based on relational information showing relations between said reference conversion information of said correcting film and said conversion information of said plural types of film for copying.

2. A correcting device as defined in claim 1, wherein said film identifying means is a DX code reader for reading a DX code which is an identification code recorded on said film for copying, and transmitting identification information of said film for copying to said control means.

3. A correcting device as defined in claim 1, wherein said film density measuring means is a negative film scanner comprising a combination of line sensors and color filters.

4. A correcting device as defined in claim 1, wherein said printing paper exposure means includes an exposure light source for illuminating a frame of said film for copying, a lens for projecting an image recorded on said film for copying on said printing paper, an optical filter controllable by said control means, a light diffuser for effecting a uniform color mixture of light having passed through said optical filter, and a shutter for shutting an optical path upon completion of exposure.

5. A correcting method for use with a photographic copying apparatus, said method comprising the steps of:

detecting identification information with a film identifying means, said identification information showing a type of film loaded for copying;

measuring density information of said film loaded for copying with a film density measuring means; and controlling printing paper exposure means with a control means based on said identification information and said density information, wherein said control means selects, based on said identification information, conversion information corresponding to said film loaded for copying, said conversion information prepared for deriving exposure information from said density information to control said printing paper exposure means, and prepared in accordance with a plurality of combinations of film for copying and printing paper, said control means deriving said exposure information from said selected conversion information corresponding to said film loaded for copying and said density information, and said control means controlling said printing paper exposure means based on said derived exposure information;

wherein said control means further controls said printing paper exposure means to test-copy one correcting film loaded, and said control means corrects said conversion information based on density information of a test copy and density information of correcting film measured by said film density measuring means, and wherein said control means is operable to correct reference conversion information of said correcting film based on said density information of said test copy and said density information measured by said film density measuring means, and thereafter to correct a plurality of said conversion information of film for copying based on relational information showing relations between said reference conversion information of said correcting film and said conversion information of said plural types of film for copying.

6. A correcting method for use with a photographic copying apparatus including a film identify means for obtaining identification information identifying a type of film loaded for copying from a plurality of types of films;

a film density measuring means for measuring density information of said film loaded for copying; and a control means operable to store plural types of conversion information corresponding to a plurality of combinations of films for copying and printing papers, said control means being operable to select one of said plural types of conversion information based on said identification information and on a printing paper employed and being further operable to control printing paper exposure means based on exposure information derived from said density information and said selected conversion information, said correcting method comprising the steps of:

test-copying a loaded corrected film on a printing paper by controlling said printing paper exposure means; and correcting said plural types of conversion information based upon density information of said test-copied printing paper and on density information of said correcting film measured by said film density measuring means;

wherein said test-copying step and said correcting step are controlled by said control means, and wherein said plural types of conversion information include one type of reference conversion information and plural types of relation information showing relations with respect to said reference conversion information determined by the combination of said film for copying and said printing paper, said step of correcting the conversion information includes correcting said reference conversion information through execution of said test-copying operation.

7. A correcting method as defined in claim 6, wherein said correcting film is formed of film identical in type to one of said plural types of film for copying.

8. A correcting method as defined in claim 6, wherein said control means is operable to execute said test copying based on exposure information prepared for said correcting film.

9. A correcting method as defined in claim 8, wherein said correcting film is formed of film identical in type to one of said plural types of film for copying.

10. A correcting method as defined in claim 6, wherein said film identifying means is a DX code reader for reading a DX code which is an identification code recorded on said film for copying, and transmitting identification information of said film for copying to said control means.

11. A correcting method as defined in claim 6, wherein said film density measuring means is a negative film scanner comprising a combination of line sensors and color filters.

12. A correcting method as defined in claim 6, wherein said printing paper exposure means includes an exposure light source for illuminating a frame of said film for copying, a lens for projecting an image recorded on said film for copying on said printing paper, an optical filter controllable by said control means, a light diffuser for effecting a uniform color mixture of light having passed through said optical filter, and a shutter for shutting an optical path upon completion of exposure.

* * * * *

UNITED STATES PATENT AND TRADEMARK OFFICE

CERTIFICATE OF CORRECTION

PATENT NO. : 5,555,073

DATED : September 10, 1996

INVENTOR(S) : Walter Grossmann, Kuraji Nitta and Koji Kita

It is certified that error appears in the above-indentified patent and that said Letters Patent is hereby corrected as shown below:

Title page, item '[75] Inventors:', "Grossman" should read --Grossmann--.

Column 1 Line 17 "changes i.e.," should read --changes, i.e.,--.

Column 3 Lines 51-52 delete "also referred to as selected conversion information".

Column 3 Line 54 after "information" insert --also referred to as selected conversion information--.

Column 7 Line 8 "am" should read --are--.

Column 8 Line 13 "convening" should read --converting--.

Column 9 Line 26 "next" should read --new--.

Column 9 Line 40 "convening" should read --converting--.

Signed and Sealed this

Third Day of December, 1996

Attest:

BRUCE LEHMAN

*Attesting Officer*

*Commissioner of Patents and Trademarks*